(12) United States Patent
Song et al.

(10) Patent No.: US 10,866,470 B2
(45) Date of Patent: *Dec. 15, 2020

(54) DISPLAY DEVICE AND MANUFACTURING METHOD THEREOF

(71) Applicant: Samsung Display Co., Ltd., Yongin-si (KR)

(72) Inventors: Seung Ki Song, Goyang-si (KR); Sung-Hwan Bae, Yongin-si (KR); Chan Sol Yoo, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/746,298

(22) Filed: Jan. 17, 2020

(65) Prior Publication Data
US 2020/0150480 A1 May 14, 2020

Related U.S. Application Data

(63) Continuation of application No. 16/194,531, filed on Nov. 19, 2018, now Pat. No. 10,571,760, which is a (Continued)

(30) Foreign Application Priority Data

Oct. 28, 2016 (KR) .......................... 10-2016-0142378

(51) Int. Cl.
G02F 1/1345 (2006.01)
G02F 1/1362 (2006.01)

(52) U.S. Cl.
CPC ........ *G02F 1/13452* (2013.01); *G02F 1/1345* (2013.01); *G02F 1/136259* (2013.01); *G02F 2001/136268* (2013.01)

(58) Field of Classification Search
CPC ............... G02F 1/13452; G02F 1/1345; G02F 1/136259; G02F 2001/136268
See application file for complete search history.

(56) References Cited

U.S. PATENT DOCUMENTS 10,133,127 B2 * 11/2018 Song .................... G02F 1/13452
10,571,760 B2 * 2/2020 Song .................... G02F 1/13452
(Continued)

FOREIGN PATENT DOCUMENTS

| KR | 10-0796490 | 1/2008 |
| KR | 10-1555915 | 10/2015 |
| KR | 10-2016-0117789 | 10/2016 |

OTHER PUBLICATIONS

Notice of Allowance dated Jul. 17, 2018, in U.S. App. No. 15/792,703.
(Continued)

Primary Examiner — Phu Vu
(74) Attorney, Agent, or Firm — H.C. Park & Associates, PLC

(57) ABSTRACT

A display device including: a first substrate; a first electrode layer disposed on an edge of the first substrate; a second electrode layer disposed on the first electrode layer; the first electrode layer and the second electrode layer defining a space in between; a metal sludge disposed in the space; and a subsidiary electrode configured to cover a side surface of the first substrate, and disposed in the space to contact the first electrode layer, the second electrode layer, and the metal sludge.

20 Claims, 13 Drawing Sheets

Related U.S. Application Data continuation of application No. 15/792,703, filed on Oct. 24, 2017, now Pat. No. 10,133,127.

(56) References Cited

U.S. PATENT DOCUMENTS

| | | |
|---|---|---|
| 2015/0145791 A1 | 5/2015 | Kim et al. |
| 2016/0027861 A1 | 1/2016 | Jung et al. |
| 2016/0291380 A1 | 10/2016 | Hong et al. |
| 2018/0004051 A1 | 1/2018 | Kim |

OTHER PUBLICATIONS

Non-Final Office Action dated Apr. 19, 2019, in U.S. Appl. No. 16/194,531.
Notice of Allowance dated Oct. 18, 2019, in U.S. Appl. No. 16/194,531.

\* cited by examiner

DISPLAY DEVICE AND MANUFACTURING METHOD THEREOF

CROSS REFERENCE TO RELATED APPLICATION

This application is a Continuation of U.S. patent application Ser. No. 16/194,531, filed Nov. 19, 2018, which is a Continuation of U.S. patent application Ser. No. 15/792,703, filed on Oct. 24, 2017, now U.S. Pat. No. 10,133,127, which claims priority to and the benefit of Korean Patent Application No. 10-2016-0142378 filed on Oct. 28, 2016, each of which is incorporated by reference for all purposes as if fully set forth herein.

BACKGROUND

Field

Exemplary embodiments relate to a display device and a manufacturing method thereof.

Discussion of the Background

A liquid crystal display, which is one of the most widely used flat panel displays at present, includes two substrates with field generating electrodes such as a pixel electrode and a common electrode, and a liquid crystal layer interposed therebetween. An amount of transmitted light is controlled by determining alignment of liquid crystal molecules of the liquid crystal layer through application of voltages to the field generating electrodes to display an image.

The two sheets of display panels configuring the liquid crystal display may include a thin film transistor array panel and an opposing display panel. A gate line transferring a gate signal and a data line transferring a data signal are formed to cross each other, and a thin film transistor connected with the gate line and the data line, a pixel electrode connected with the thin film transistor, and the like may be formed on the thin film transistor array panel. A light blocking member, a color filter, a common electrode, and the like may be formed on the opposing display panel. In some cases, the light blocking member, the color filter, and the common electrode may be formed on the thin film transistor array panel.

A pad portion connected with end portions of the gate line and the data line is disposed at an edge of the thin film transistor array panel. The pad portion may be connected with an integrated circuit (IC) to receive a predetermined signal and to transmit it to the gate line and the data line. In this case, when contact resistance between the pad portion and the IC is high, there is a problem that signal transmission is not performed normally.

The above information disclosed in this Background section is only for enhancement of understanding of the background of the inventive concepts. Therefore, it may contain information that does not form the prior art that was already known to a person of ordinary skill in the art or was publically available prior to an effective filing date of subject matter disclosed herein.

SUMMARY

Exemplary embodiments provide stable signal transmission by reducing resistance by widening contact areas of electrode layers constituting a pad portion.

Additional features of the invention will be set forth in the description which follows, and in part will be apparent from the description, or may be learned by practice of the invention.

An exemplary embodiment discloses a display device including: a first substrate; a first electrode layer disposed on an edge of the first substrate; a second electrode layer disposed on the first electrode layer; the first electrode layer and the second electrode layer defining a space in between; a metal sludge disposed in the space; and a connection electrode configured to cover a side surface of the first substrate, and disposed in the space to contact the first electrode layer, the second electrode layer, and the metal sludge.

The metal sludge may include the same material as at least one of the first electrode layer and the second electrode layer.

The first electrode layer and the second electrode layer may include a same material.

The display device may further include: a second substrate configured to face the first substrate; and a dam disposed between the first substrate and the second substrate.

The dam may surround the connection electrode, in a plan view.

The display device may further include a common electrode disposed below the second substrate, and the dam may be disposed between the common electrode and the connection electrode.

The display device may further include a spacer disposed between the dam and the second substrate.

The connection electrode may cover a side surface of the second substrate, and may be further disposed between the second electrode layer and the second substrate.

The first electrode layer and the second electrode layer may constitute a gate pad portion.

The display device may further include: a gate electrode disposed on the first substrate; a semiconductor configured to overlap the gate electrode; and a source electrode and a drain electrode disposed on the semiconductor, and the gate pad portion may include a same material as the gate electrode.

An exemplary embodiment also discloses a manufacturing method of a display device, including: forming a first metal material layer on a first substrate; forming a photosensitive layer on an edge of the first metal material layer; forming a second metal material layer on the first metal material layer and the photosensitive layer; forming a first electrode layer and a second electrode layer on the first electrode layer by patterning the first metal material layer and the second metal material layer; forming a space between the first electrode layer and the second electrode layer by removing the photosensitive layer; polishing an edge of the first substrate; and forming a connection electrode on a side surface of the first substrate.

In the polishing an edge of the first substrate, the first electrode layer or the second electrode layer may be polished to generate a metal sludge, and the metal sludge may be positioned in the space.

The metal sludge may include a same material as at least one of the first electrode layer and the second electrode layer.

The manufacturing method may further include: forming a dam on the first substrate; and forming a second substrate to face the first substrate.

The dam may surround the connection electrode, in a plan view.

The manufacturing method may further include forming a common electrode below the second substrate, and the dam may be disposed between the common electrode and the connection electrode.

The manufacturing method may further include forming a spacer to overlap the dam below the second substrate.

The connection electrode may be disposed on side surfaces of the first substrate and the second substrate, between the first substrate and the second substrate, and in the space.

The first electrode layer and the second electrode layer may constitute a gate pad portion.

The manufacturing method may further include: forming a gate electrode on the first substrate; forming a semiconductor overlapping the gate electrode; and forming a source electrode and a drain electrode on the semiconductor, and the gate pad portion and the gate electrode may be simultaneously formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
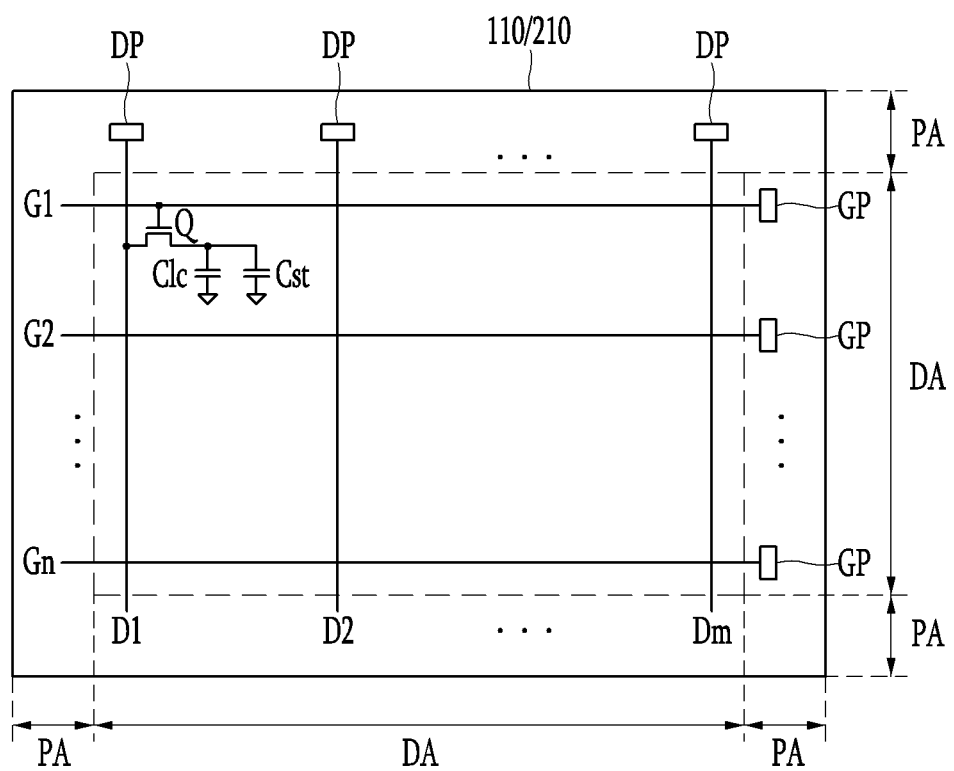
FIG. 1 is a top plan view illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Further, since sizes and thicknesses of constituent members shown in the accompanying drawings are arbitrarily given for better understanding and ease of description, the exemplary embodiments are not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A liquid crystal display according to an exemplary embodiment will now be described with reference to FIG. 1.

FIG. 1 is a top plan view illustrating a display device according to an exemplary embodiment.

The display device according to an exemplary embodiment includes a first substrate 110 and a second substrate 210 which face each other.

Each of the first substrate 110 and the second substrate 210 is divided into a display area DA and a peripheral area PA. The display area DA is positioned at central portions of the first substrate 110 and the second substrate 210, and the peripheral area PA is positioned to surround edges of the display area DA. The display area DA serves to display an image, and a driver for transmitting a driving signal to display images in the display area DA is disposed in the peripheral area PA.

In the display area DA, a plurality of gate lines G1 . . . , and Gn are formed in a direction parallel to each other, and a plurality of data lines D1 . . . , and Dm are formed in a direction parallel to each other. The gate lines G1 . . . , and Gn and the data lines D1 . . . , and Dm are insulated from each other, and are crossing each other to define a plurality of pixels.

A thin film transistor Q, a liquid crystal capacitor Clc, and a storage capacitor Cst are formed in each pixel. A control terminal of the thin film transistor Q is connected with one of the gate lines G1 . . . , and Gn, an input terminal thereof is connected with one of the data lines D1 . . . , and Dm, and an output terminal thereof is connected with a first terminal of the liquid crystal capacitor Clc and a first terminal of the storage capacitor Cst. A second terminal of the liquid crystal capacitor Clc may receive a common voltage, and a second terminal of the storage capacitor Cst may receive a reference voltage.

The gate lines G1 . . . , and Gn and the data lines D1 . . . , and Dm extend to the peripheral area PA. In the peripheral area PA, a gate pad portion GP connected with the gate lines G1 . . . , and Gn and a data pad portion DP connected with the data lines D1 . . . , and Dm are disposed. The gate pad portion GP may be connected with an external terminal, to receive a gate signal from a gate driver and to transmit it to the gate lines G1 . . . , and Gn. The data pad portion DP may be connected with the external terminal, to receive the gate signal from the data driver and transmit it to the data lines D1 . . . , and Dm.

Although the gate pad portion GP is illustrated to be disposed at a right edge of the display area DA in FIG. 1, the exemplary embodiments are not limited thereto. For example, a position of the gate pad portion GP may be variously changed. In addition, the gate pad portion GP may be disposed at opposite edges of the display area DA.

Although the data pad portion DP is illustrated to be disposed at an upper edge of the display area DA, the exemplary embodiments are not limited thereto. For example, a position of the data pad portion DP may be variously changed. In addition, the data pad portion DP may be disposed at opposite edges of the display area DA.

Hereinafter, the peripheral area of the display device according to an exemplary embodiment will be described with reference to FIG. 2 and FIG. 3.

Figure 2:
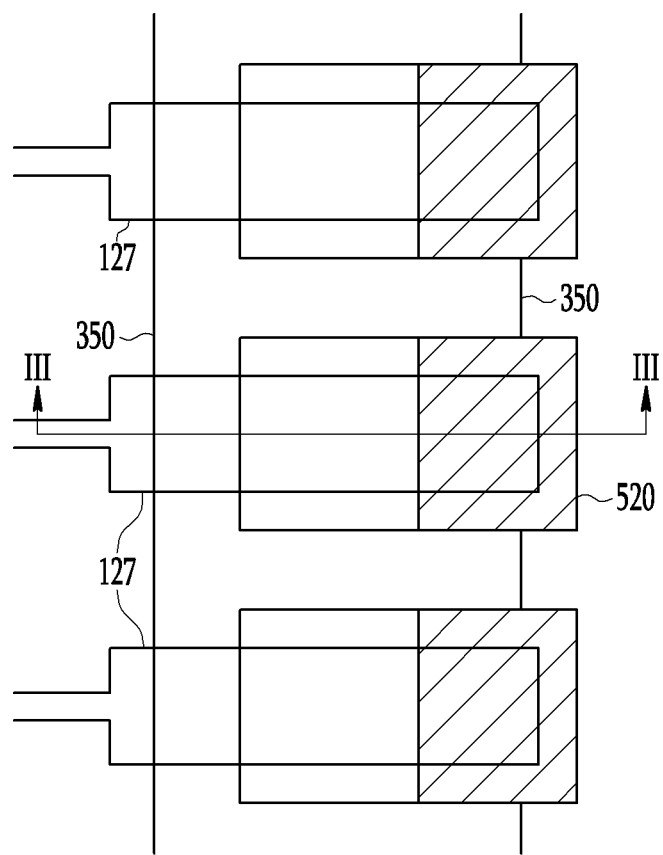
FIG. 2 is a top plan view illustrating a peripheral area of a display device according to an exemplary embodiment.
Figure 3:
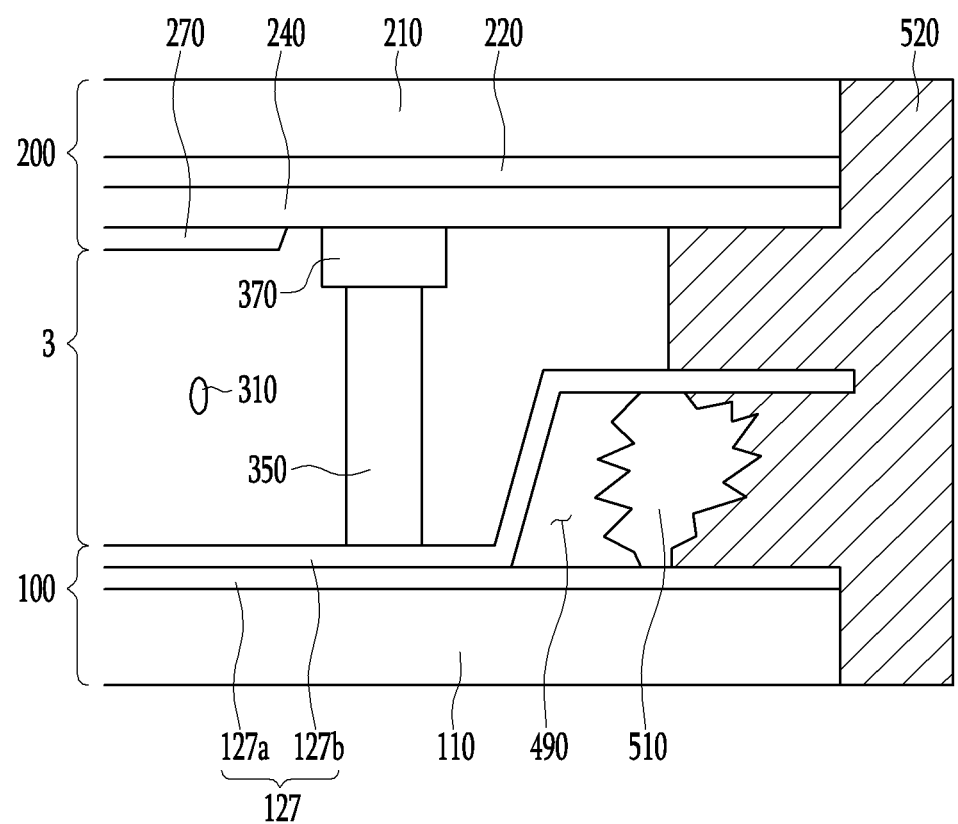
FIG. 3 is a cross-sectional view taken along an III-III line of FIG. 2.

FIG. 2 is a top plan view illustrating a peripheral area of a display device according to an exemplary embodiment, and FIG. 3 is a cross-sectional view taken along an III-III line of FIG. 2.

The display device according to the exemplary embodiment as shown in FIG. 3 includes a lower display panel 100 and an upper display panel 200 which face each other, and a liquid crystal layer 3 interposed between the two display panels 100 and 200.

First, the lower display panel 100 will be described.

A gate pad portion 127 is disposed on the first substrate 110. The gate pad portion 127 includes a first electrode layer 127a disposed on the first substrate 110 and a second electrode layer 127b disposed on the first electrode layer 127a.

The first electrode layer 127a may be formed of a low-resistance metal material such as copper. The first electrode layer 127a may be disposed immediately on the first substrate 110.

The second electrode layer 127b may be formed of a same material as the first electrode layer 127a. For example, the second electrode layer 127b may be formed of a low-resistance metal material such as copper. The second electrode layer 127b may be formed of a material that is different from that of the first electrode layer 127a. For example, the first electrode layer 127a may include copper, and the second electrode layer 127b may include aluminum.

In one portion, the second electrode layer 127b is disposed immediately on the first electrode layer 127a, and the second electrode layer 127b contacts the first electrode layer 127a. In another portion, a space 490 is disposed between the second electrode layer 127b and the first electrode layer 127a such that the second electrode layer 127b and the first electrode layer 127a may not contact each other. The second electrode layer 127b covers an upper surface and a side surface of the space 490. In this case, the second electrode layer 127*b* does not cover a portion of the side surface of the space 490. The side surface of the space 490 positioned outermost of the display device is not covered by the second electrode layer 127*b*.

A metal sludge 510 is positioned in the space 490. The metal sludge 510 may include the same material as that of at least one of the first electrode layer 127*a* and the second electrode layer 127*b*. For example, the metal sludge 510 may include copper, aluminum, or the like. The first electrode layer 127*a* and the second electrode layer 127*b* may be disposed on an edge of the first substrate 110. Side surfaces of the first electrode layer 127*a* and the second electrode layer 127*b* may be positioned on a same line as a side surface of the first substrate 110. In a step of polishing the first substrate 110, the first electrode layer 127*a* and the second electrode layer 127*b* may be polished together, and the metal sludge 510 may be a byproduct of this polishing step.

The first electrode layer 127*a* and the second electrode layer 127*b* positioned above and below the space 490 are not directly connected with each other, but are connected to each other through the metal sludge 510. Specifically, the first electrode layer 127*a* and the metal sludge 510 are directly connected with each other, and the second electrode layer 127*b* and the metal sludge 510 are connected to each other. Accordingly, the first electrode layer 127*a* and the second electrode layer 127*b* connected to each other through the metal sludge 510.

Next, the second display panel 200 will now be described.

A light blocking member 220 is formed below the second substrate 210. The light blocking member 220 is also called a black matrix and serves to prevent light leakage. The light blocking member 220 may be formed in the entire peripheral area PA.

Although the light blocking member 220 has been described to be formed below the upper display panel 200 in an exemplary embodiment, the exemplary embodiments are not limited thereto. The light blocking member 220 may be formed in the lower display panel 100.

An overcoat 240 is formed below the light blocking member 220, and may be omitted.

A common electrode 270 is formed below the overcoat 240. The common electrode 270 may be formed of a transparent conductive material such as indium-tin oxide (ITO) and indium-zinc oxide (IZO). A common voltage may be applied to the common electrode 270.

A dam 350 is disposed between the first substrate 110 and the second substrate 210. The dam 350 may be formed of an organic insulating material or an inorganic insulating material. The dam 350 can be formed as a single layer or multiple layers. The dam 350 may be formed to have a column shape. The dam 350 is positioned inside the space 490.

A spacer 370 is disposed between the dam 350 and the second substrate 210. A sum of thicknesses of the dam 350 and the spacer 370 may correspond to a cell gap of the display device.

A subsidiary electrode hereinafter referred to as connection electrode 520 may be disposed on side surfaces of the first substrate 110 and the second substrate 210. The connection electrode 520 may be formed of a low-resistance metal such as silver. The connection electrode 520 covers the side surfaces of the first substrate 110 and the second substrate 210, and is also disposed between the first substrate 110 and the second substrate 210. The connection electrode 520 is also disposed in the space 490. As a result, the connection electrode 520 is disposed between the first electrode layer 127*a* and the second electrode layer 127*b*.

The connection electrode 520 is also disposed between the second electrode layer 127*b* and the second substrate 210. When a metal paste is printed to cover the side surfaces of the first substrate 110 and the second substrate 210, the metal paste enters between the first substrate 110 and the second substrate 210 by a capillary force. The connection electrode 520 contacts the first electrode layer 127*a*, the second electrode layer 127*b*, and the metal sludge 510.

Although not shown, the connection electrode 520 may be connected to the driver. For example, the connection electrode 520 may be connected with a gate driver IC to receive a gate driving signal and transmit it to the gate pad portion 127. The connection electrode 520 may contact the first electrode layer 127*a*, the second electrode layer 127*b*, and the metal sludge 510 to increase a contact area, and thus contact resistance between the driver and the gate pad portion 127 may be reduced.

In a plan view, the dam 350 has a shape surrounding the connection electrode 520. The connection electrode 520 may include a plurality of connection electrodes 520, which independently contact each gate pad portion 127. The dam 350 serves to prevent adjacent gate pad portions 127 from being connected with each other. In addition, the common electrode 270 is disposed inside the dam 350. As a result, the dam 350 is disposed between the common electrode 270 and the connection electrode 520. The dam 350 serves to prevent the common electrode 270 and the connection electrode 520 from being short-circuited.

Hereinafter, one pixel disposed in the display area of the display device according to an exemplary embodiment will be described with reference to FIG. 4 and FIG. 5.

Figure 4:
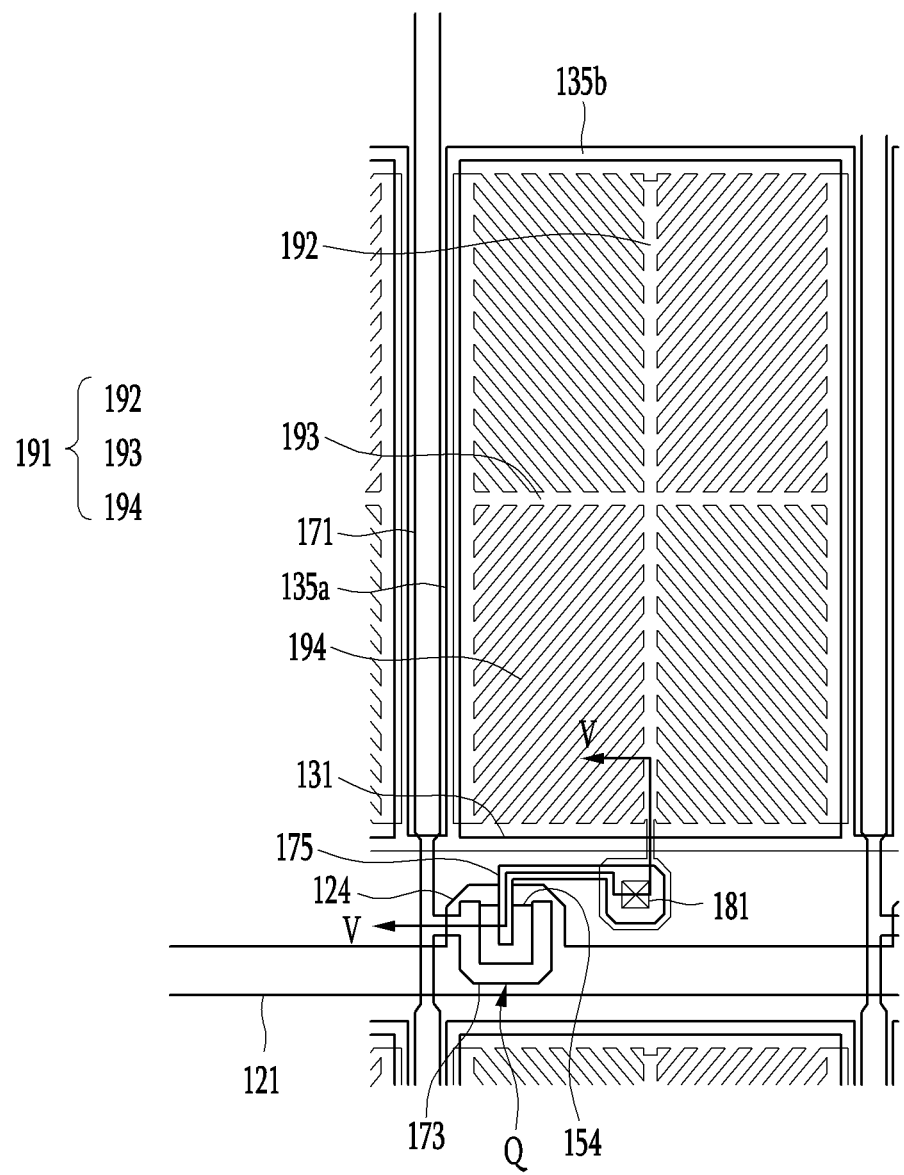
FIG. 4 is a top plan view illustrating a display area of a display device according to an exemplary embodiment.
Figure 5:
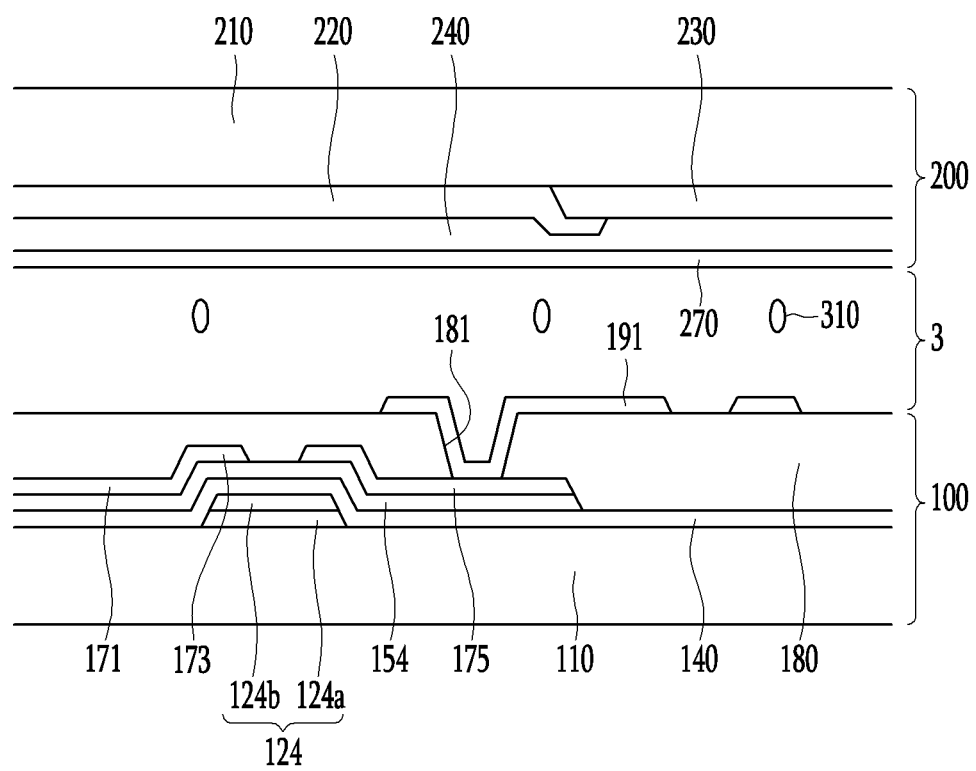
FIG. 5 is a cross-sectional view taken along a V-V line of FIG. 4.

FIG. 4 is a top plan view illustrating a display area of a display device according to an exemplary embodiment, and FIG. 5 is a cross-sectional view taken along a V-V line of FIG. 4.

First, the lower display panel 100 will be described.

A gate line 121 and a gate electrode 124 protruded from the gate line 121 are disposed on the first substrate 110.

The gate line 121 extends in a substantially horizontal direction to transfer a gate signal. The gate electrode 124 protrudes upward from the gate line 121 in the plan view. However, the exemplary embodiments are not limited thereto, and a protruded shape of the gate electrode 124 can be variously modified. In addition, the gate electrode 124 may be disposed on the gate line 121 without protruding from the gate line 121.

The gate electrode 124 may be a double layer including a lower gate electrode 124*a* and an upper gate electrode 124*b*. However, the exemplary embodiments are not limited thereto, and the gate electrode 124 may be formed of a single layer or may be formed of multiple layers including three or more layers.

Referring to FIG. 3, the gate pad portion 127 may include a same material as the gate electrode 124. In this case, the first electrode layer 127*a* of the gate pad portion 127 may be formed of a same material as the lower gate electrode 124*a*. The second electrode layer 127*b* of the gate pad portion 127 may be made of a same material as the upper gate electrode 124*b*.

Similarly, the gate line 121 may be formed of a same material as that of the gate pad portion 127. The gate pad portion 127 may be connected to an end portion of the gate line 121.

Storage electrodes 135*a* and 135*b* protruded from a reference voltage line 131 and the reference voltage line 131 may be further disposed on the first substrate 110.

The reference voltage line 131 extends in a direction substantially parallel to the gate line 121 and is spaced apart from the gate line 121. A constant voltage may be applied to the reference voltage line 131. The storage electrodes 135a and 135b include a pair of first storage electrodes 135a that extend in a direction that is substantially perpendicular with respect to the reference voltage line 131, and a second storage electrode 135b that connects the pair of first storage electrodes 135a. The reference voltage line 131 and the storage electrodes 135a and 135b may have such a shape so as to surround a pixel electrode 191 to be described later.

A gate insulating layer 140 is disposed on the gate line 121, the gate electrode 124, the reference voltage line 131, and the storage electrodes 135a and 135b. The gate insulating layer 140 may be formed of an inorganic insulating material such as a silicon nitride (SiNx), a silicon oxide (SiOx), or the like. The gate insulating layer 140 may be formed as a single layer or a multilayer.

A semiconductor 154 is disposed on the gate insulating layer 140. The semiconductor 154 may be disposed on the gate electrode 124. The semiconductor 154 may be formed of amorphous silicon, polycrystalline silicon, or a metal oxide.

An ohmic contact (not illustrated) may be provided on the semiconductor 154. The ohmic contact may be made of a material such as n+ hydrogenated amorphous silicon in which an n-type impurity such as phosphorus is doped with a high concentration, or of a silicide.

A data line 171, a source electrode 173, and a drain electrode 175 are formed on the semiconductor 154.

The data line 171 serves to transfer a data signal, and extends in a direction substantially perpendicular to the reference voltage line 131 to cross it. The source electrode 173 may protrude from the data line 171 over the gate electrode 124, and may be bent in a U-shape. The drain electrode 175 includes a first-side wide end portion and second-side bar-shaped end portion. The wide end portion of the drain electrode 175 overlaps the pixel electrode 191. The bar-shaped end portion of the drain electrode 175 is partially surrounded by the source electrode 173. However, the exemplary embodiments are not limited thereto, and the shape of the source electrode 173 and the drain electrode 175 may be variously modified.

The gate electrode 124, the source electrode 173, and the drain electrode 175 constitute one thin film transistor Q together with the semiconductor 154. In this case, a channel of the thin film transistor Q is formed in the semiconductor 154 between the source electrode 173 and the drain electrode 175.

A passivation layer 180 is disposed on the data line 171, the source electrode 173, and the drain electrode 175. The passivation layer 180 is also disposed on the semiconductor 154 exposed between the source electrode 173 and the drain electrode 175. The passivation layer 180 may be formed of an organic insulating material or an inorganic insulating material, and may be formed of a single layer or a multilayer.

A contact hole 181 that overlaps at least a portion of the drain electrode 175 is formed in the passivation layer 180. The contact hole 181 may expose the wide end portion of the drain electrode 175.

The pixel electrode 191 is disposed on the passivation layer 180. The pixel electrode 191 may be made of a transparent conductive material such as indium-tin oxide (ITO), indium-zinc oxide (IZO), or the like. The pixel electrode 191 is connected with the drain electrode 175 through the contact hole 181. Accordingly, when the thin film transistor Q is turned on, the pixel electrode 191 receives the data voltage through the drain electrode 175.

An overall shape of the pixel electrode 191 is quadrangle, and the pixel electrode 191 includes a horizontal stem 193 and a vertical stem 192 which cross each other, and a minute branch 194 extended therefrom. The pixel electrode 191 is divided into four sub-regions by the horizontal stem 193 and the vertical stem 192. The minute branch 194 may obliquely extend from the horizontal stem 193 and the vertical stem 192, and the extending direction thereof may form an angle of substantially 45 or 135 degrees with the gate line 121 or the horizontal stem 193.

In an exemplary embodiment, the pixel electrode 191 may further include an outer stem that surrounds an outer circumference of subpixels.

A disposal form of the aforementioned subpixels, a structure of the thin film transistor, and a shape of the pixel electrode are merely examples, and the exemplary embodiments are not limited thereto such that numerous modifications are possible. For example, one subpixel may include a plurality of regions, and different voltages may be applied to each of the regions. To that end, a plurality of thin film transistors may be formed in one subpixel.

Although not illustrated, a first alignment layer may be formed in an internal surface of the lower display panel 100. The first alignment layer may be disposed on the pixel electrode 191.

Next, the second display panel 200 will be described.

The light blocking member 220 may be formed below the second substrate 210. The light blocking member 220 may overlap the gate line 121, the data line 171, the thin film transistor Q, and the like. As a result, the light blocking member 220 may be formed at a boundary of each pixel.

A plurality of color filters 230 may be formed below the second substrate 210. The color filters 230 are mostly present in a region surrounded by the light blocking member 220, and may extend in a vertical direction along a column of the pixel electrode 191. Each color filter 230 may display one of three primary colors. The primary colors may be, for example, three primary colors such as red, green, and blue, or yellow, cyan, magenta, and the like. In an exemplary embodiment, it has been described that the color filters 230 are formed in the upper display panel 200, but the exemplary embodiments are not limited thereto. The color filters 230 may be formed in the lower display panel 100.

The overcoat 240 is formed in the color filter 230 and the light blocking member 220. The overcoat 240 may be formed of an organic insulating material, and serves to prevent exposure of the color filter 230 and to provide a smooth surface.

The common electrode 270 is formed below the overcoat 240.

Although not illustrated, a second alignment layer may be formed at an internal surface of the upper display panel 200. The second alignment layer may be disposed below the common electrode 270.

The liquid crystal layer 3 may be formed of a plurality of liquid crystal molecules 310 having negative dielectric anisotropy, and the liquid crystal molecules 310 of the liquid crystal layer 3 may be aligned so that long axes thereof are perpendicular with respect to the surfaces of the two display panels 100 and 200 in a state in which no electric field is applied.

The pixel electrode 191 receiving a data voltage generates an electric field together with the common electrode 270 to determine a direction of the liquid crystal molecules 310 of the liquid crystal layer 3 disposed between the two electrodes 191 and 270. Depending on the directions of the liquid crystal molecules 310 determined as such, luminance of the light passing through liquid crystal layer 3 can be varied.

In an exemplary embodiment, the gate pad portion includes two electrode layers, a space is formed between two electrode layers, and a metal sludge is positioned in the space. Accordingly, it is possible to reduce contact resistance between the gate pad portion and the connection electrode. However, the exemplary embodiments are not limited thereto. The data pad portion may also include two electrode layers, a space may be formed between two electrode layers, and a metal sludge may be positioned in the space. Accordingly, it is possible to reduce contact resistance between the data pad portion and the connection electrode.

Next, a display device according to another exemplary embodiment will be described with reference to FIG. 6 and FIG. 7.

Figure 6:
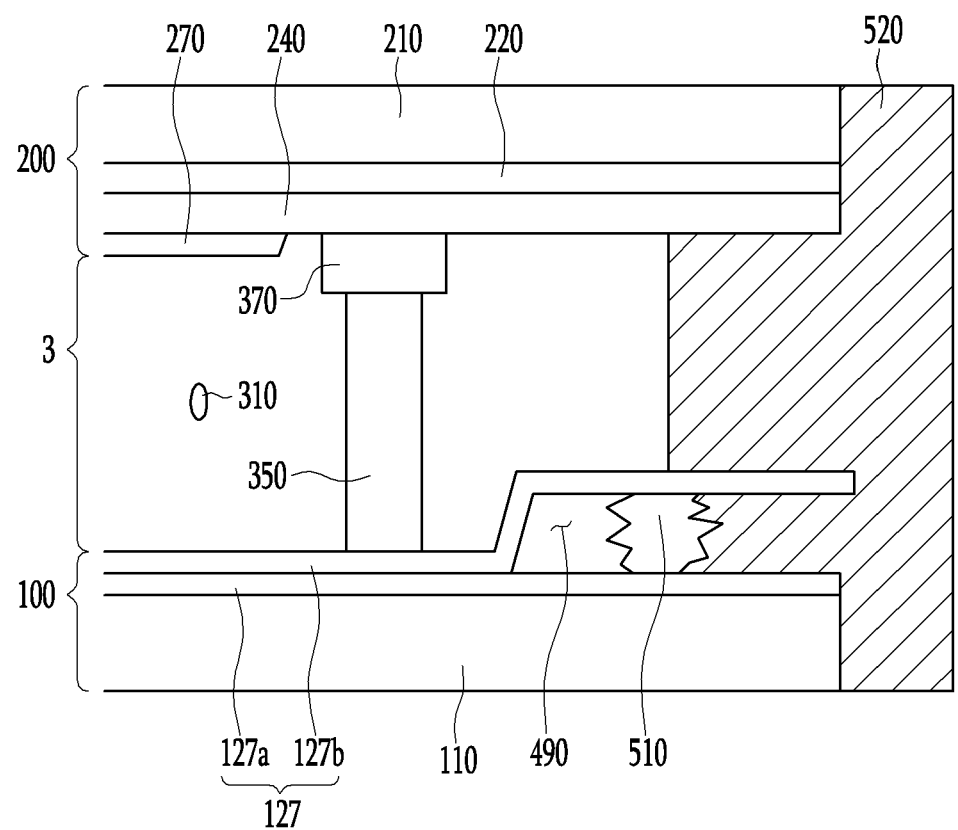
FIG. 6 and FIG. 7 illustrate cross-sectional views of a display device according to another exemplary embodiment.
Figure 7:
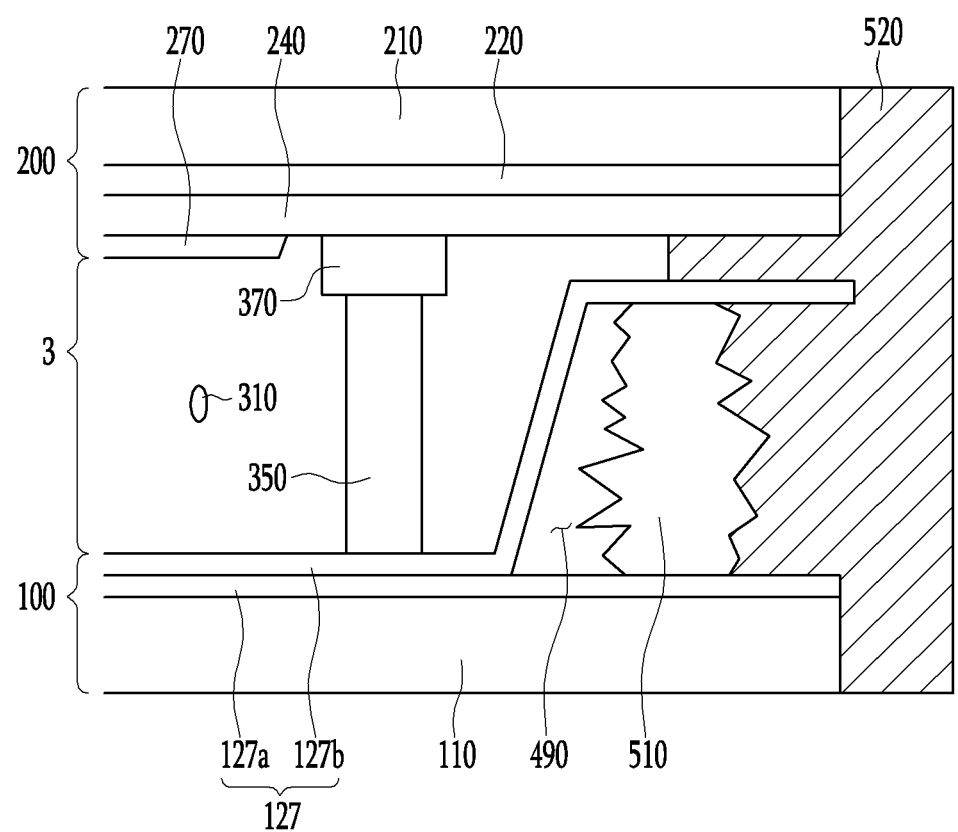

FIG. 6 and FIG. 7 illustrate cross-sectional views of a display device according to another exemplary embodiment.

As shown in FIG. 6, a height of the space 490 may be lower compared with the case of the display device according to the exemplary embodiment illustrated in FIG. 3. As a result, a distance between the first electrode layer 127a and the second electrode layer 127b may be reduced.

As shown in FIG. 7, the height of the space 490 may be higher compared with the case of the display device according to the exemplary embodiment illustrated in FIG. 3. As a result, a distance between the first electrode layer 127a and the second electrode layer 127b may be increased.

As such, the height of the space may be appropriately adjusted. Similarly, a width of the space may be appropriately adjusted. The height and width of the space can be appropriately selected in consideration of the size and amount of the metal sludge.

Next, a manufacturing method of a display device according to an exemplary embodiment will be described with reference to FIG. 8 to FIG. 13.

FIG. 8 to FIG. 13 are stepwise cross-sectional views illustrating a manufacturing method of a display device according to an exemplary embodiment. FIG. 8 to FIG. 13 illustrate a display area and a peripheral area. On the basis of the dotted line, the left side shows the display area and the right side shows the peripheral area.

Figure 8:
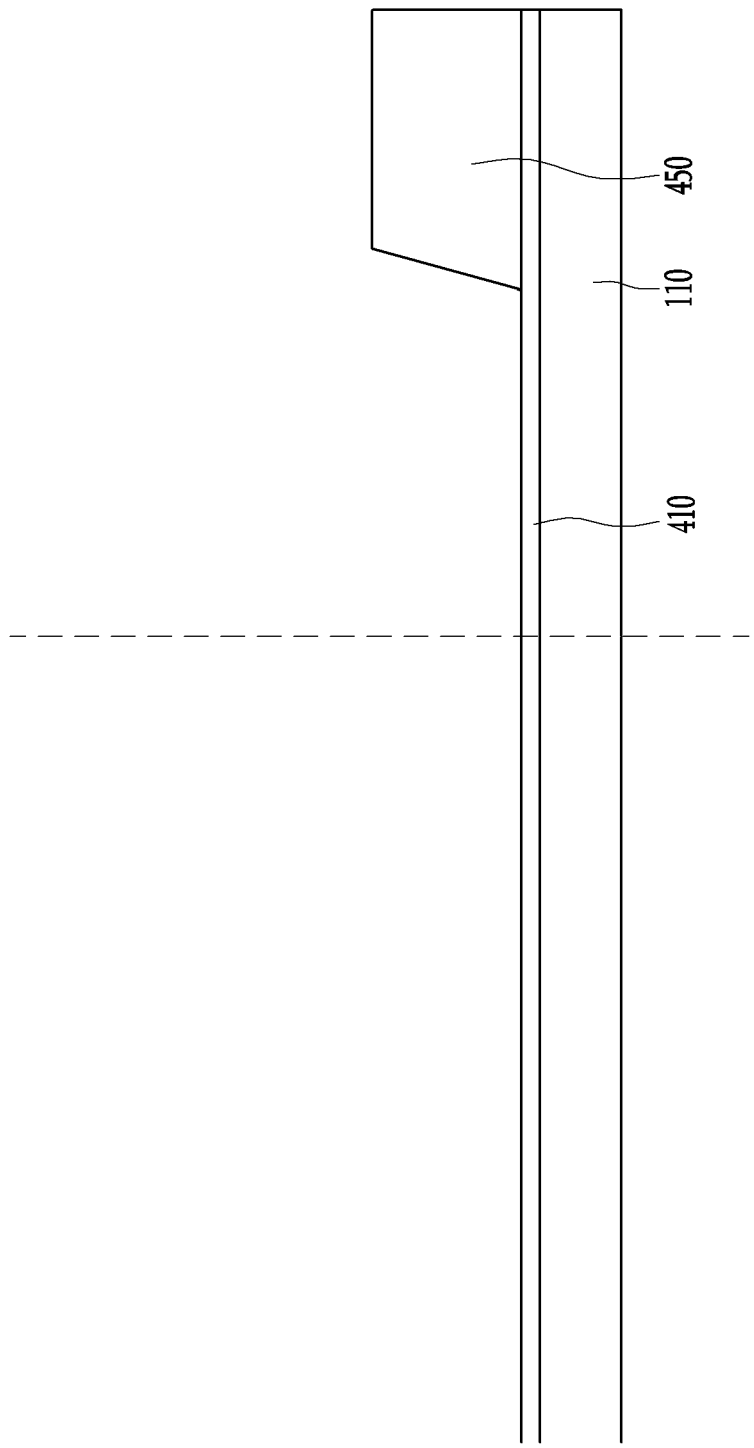
FIG. 8, FIG. 9, FIG. 10, FIG. 11, FIG. 12, and FIG. 13 are stepwise cross-sectional views illustrating a manufacturing method of a display device according to an exemplary embodiment.

As shown in FIG. 8, a first metal material layer 410 is disposed on the first substrate 110. The first metal material layer 410 may be formed of a low-resistance metal material such as copper.

Next, a photosensitive layer 450 is disposed on the first metal material layer 410. The photosensitive layer 450 is patterned to be disposed on an edge of the first metal material layer 410.

Figure 9:
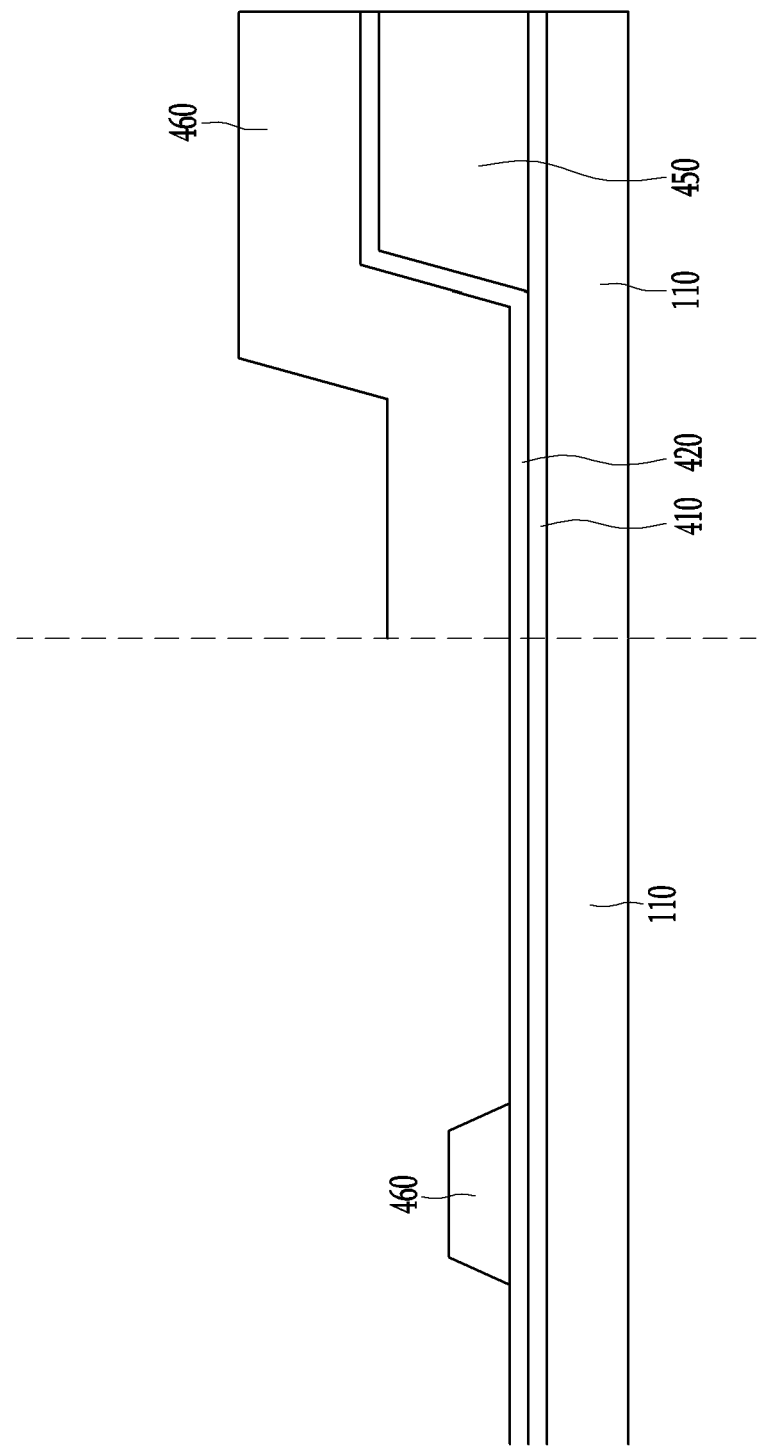

As shown in FIG. 9, a second metal material layer 420 is disposed on the first metal material layer 410 and the photosensitive layer 450. The second metal material layer 420 may be formed of a same material as that of the first metal material layer 410. For example, the second metal material layer 420 may be formed of the low-resistance metal material such as copper. The second metal material layer 420 may be formed of a metal that is different from that of the first metal material layer 410. For example, the first metal material layer 410 may include copper, and the second metal material layer 420 may include aluminum.

In one portion, the second metal material layer 420 is disposed immediately on the first metal material layer 410, and the second metal material layer 420 contacts the first metal material layer 410. In another portion, the photosensitive layer 450 is disposed between the second metal material layer 420 and the first metal material layer 410 such that the second metal material layer 420 and the first metal material layer 410 may not contact each other. The second metal material layer 420 covers an upper surface and a side surface of the photosensitive layer 450. In this case, the second metal material layer 420 covers a portion of the side surface of the photosensitive layer 450. The side surface of the photosensitive layer 450 positioned outermost of the display device is not covered by the second metal material layer 420. The side surface of the photosensitive layer 450 which is not covered by the second metal material layer 420 may be positioned on a same line as a side surface of the first substrate 110.

Figure 10:
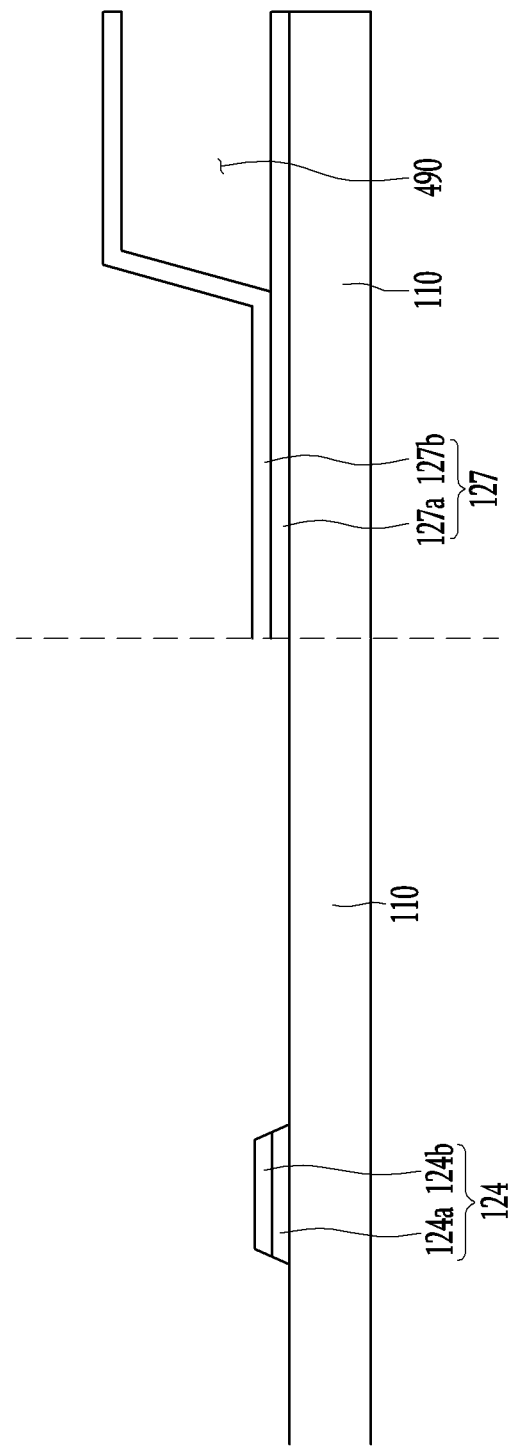

A different photosensitive layer 460 is disposed on the second metal material layer 420 to be patterned. As shown in FIG. 10, the first metal material layer 410 and the second metal material layer 420 are etched by using the patterned photosensitive layer 460 to form a gate electrode 124 and a gate pad portion 127.

The gate electrode 124 may include a lower gate electrode 124a and an upper gate electrode 124b. The gate pad portion 127 may include a first electrode layer 127a and a second electrode layer 127b. The gate electrode 124 and the gate pad portion 127 may be simultaneously formed in a same process, and may be made of a same material. The first electrode layer 127a may be formed of a same material as the lower gate electrode 124a, and the second electrode layer 127b may be formed of a same material as the upper gate electrode 124b.

Next, the photosensitive layers 450 and 460 are removed. A space 490 is formed between the first electrode layer 127a and the second electrode layer 127b while the photosensitive layer 450 disposed between the first metal material layer 410 and the second metal material layer 420 is removed. A shape of the space 490 corresponds to a shape of the photosensitive layer 450. The shape of the space 490 can be variously changed by varying the design of the shape of the photosensitive layer 450. The width and height of the space 490 can be determined by appropriately selecting the height, the width, and the like of the photosensitive layer 450.

Figure 11:
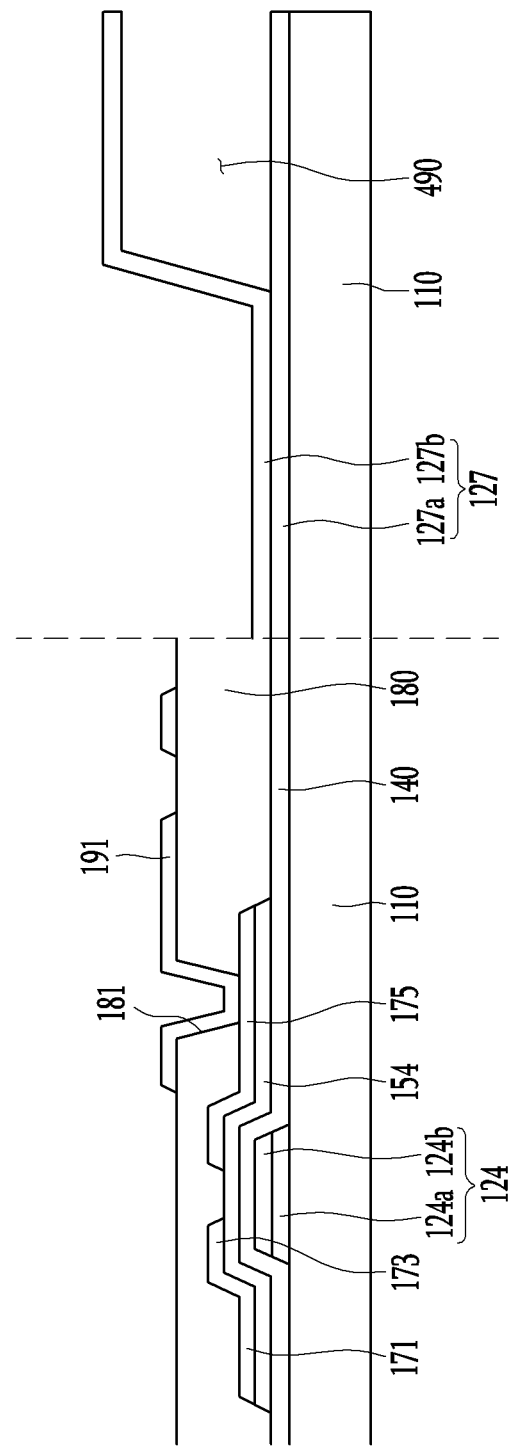

As shown in FIG. 11, a gate insulating layer 140 is disposed on the gate electrode 124 and a semiconductor 154 is disposed on the gate insulating layer 140. A source electrode 173 and a drain electrode 175 are disposed on the semiconductor 154, and a passivation layer 180 is disposed on the source electrode 173 and the drain electrode 175. A contact hole 181 is formed by patterning the passivation layer 180 such that at least a portion of the drain electrode 175 is exposed. A pixel electrode 191 is disposed on the passivation layer 180. The pixel electrode 191 is connected with the drain electrode 175 through the contact hole 181.

Figure 12:
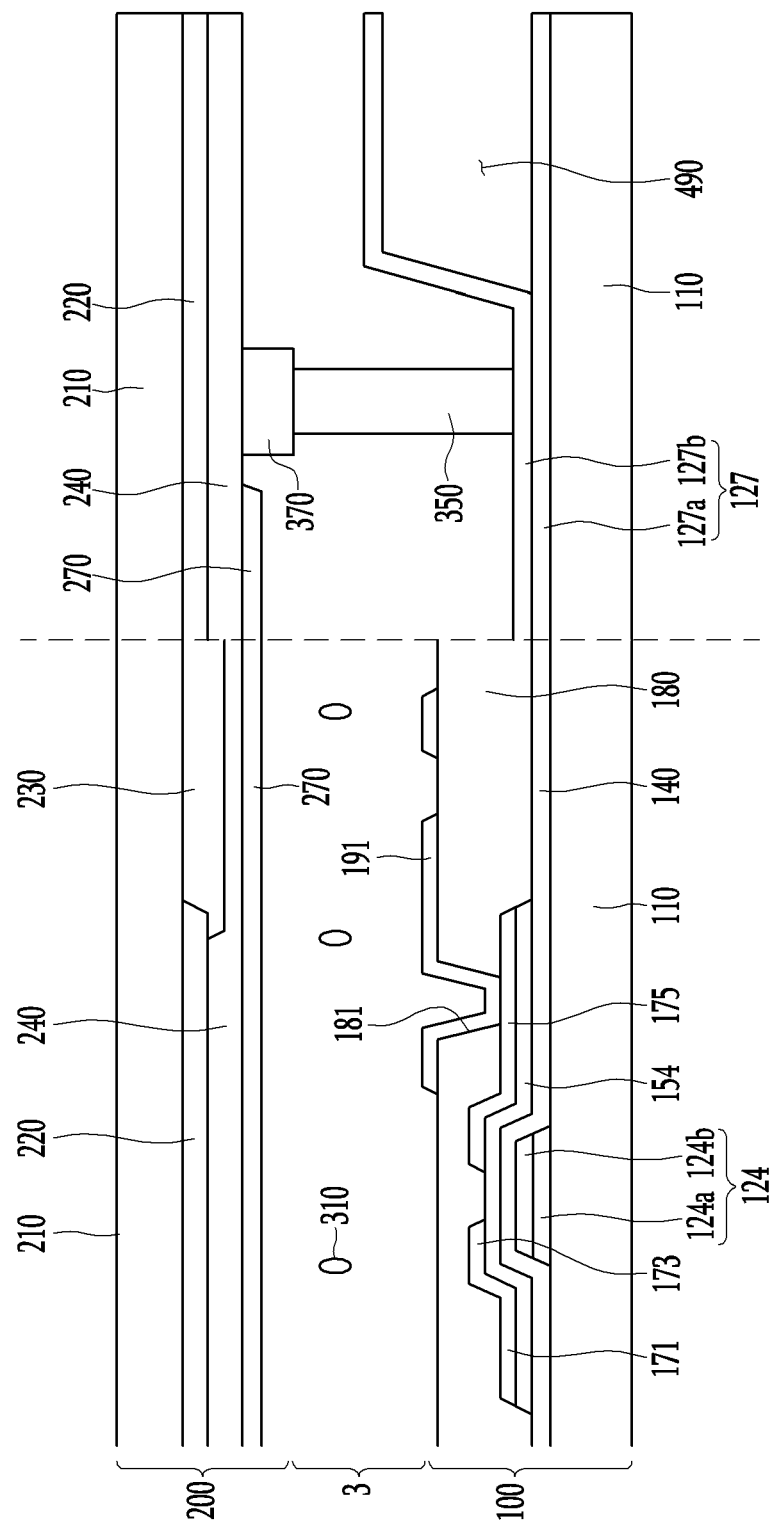

As shown in FIG. 12, a dam 350 is disposed on the second electrode layer 127b. The dam 350 may be formed of an organic insulating material or an inorganic insulating material. The dam 350 can be formed as a single layer or multiple layers. The dam 350 may be formed to have a column shape. The dam 350 is positioned inside the space 490.

A light blocking member 220 and a color filter 230 are formed below the second substrate 210. An overcoat 240 is formed to cover the light blocking member 220 and the color filter 230, and is planarized.

A common electrode 270 is formed below the overcoat 240. The common electrode 270 is disposed in the entire display area, and is formed only in part of the peripheral area and is not formed in a remaining portion.

A spacer 370 may be formed below the overcoat 240. The common electrode 270 is disposed inside the spacer 370.

The first substrate 110 and the second substrate 210 are attached to each other, and the liquid crystal layer 3 including the liquid crystal molecules 310 is formed between the first substrate 110 and the second substrate 210. In this case, the dam 350 overlaps the spacer 370. As described above, it has been described that the dam 350 is disposed on the first substrate 110, and the spacer 370 is disposed below the second substrate 210, but the exemplary embodiments are not limited thereto. Both the dam 350 and the spacer 370 may be disposed on the first substrate 110. Alternatively, both of the dam 350 and the spacer 370 may be disposed below the second substrate 210.

Figure 13:
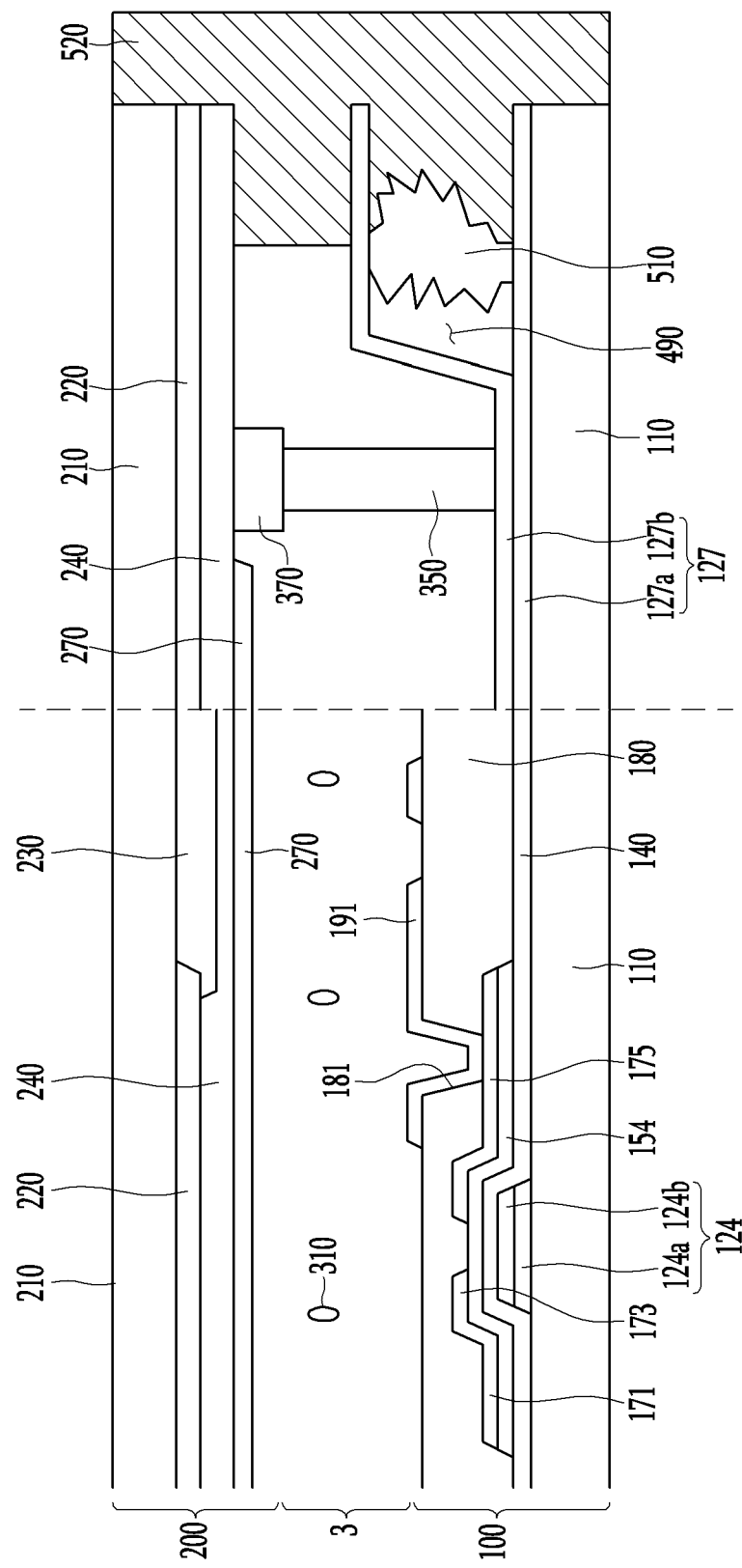

As shown in FIG. 13, edges of the first substrate 110 and the second substrate 210 are polished. The first electrode layer 127a and the second electrode layer 127b may be formed up to the edge of the first substrate 110, and as the first substrate 110 is polished, the first electrode layer 127a and the second electrode layer 127b may be polished together. A metal sludge 510 is formed as the first electrode layer 127a or the second electrode layer 127b is polished. The metal sludge 510 may include a same material as at least one of the first electrode layer 127a and the second electrode layer 127b. The metal sludge 510 may be positioned in the space 490 between the first electrode layer 127a and the second electrode layer 127b.

A metal paste is printed on the side surfaces of the first substrate 110 and the second substrate 210 to form a connection electrode 520. When the metal paste is printed so as to cover the side surfaces of the first substrate 110 and the second substrate 210, the metal paste is inserted between the first substrate 110 and the second substrate 210 by a capillary force. Since the dam 350 is positioned between the first substrate 110 and the second substrate 210, the metal paste is blocked by the dam 350, and thus the connection electrode 520 is formed only outside the dam 350. Since the dam 350 is positioned between the common electrode 270 and the connection electrode 520, it is possible to prevent the connection electrode 520 from being short-circuited to the common electrode 270. In a plan view, the dam 350 has a shape surrounding the connection electrode 520. The connection electrode 520 may include a plurality of connection electrodes 520, which independently contact each gate pad portion 127. The dam 350 serves to prevent adjacent gate pad portions 127 from being connected with each other.

The connection electrode 520 is positioned between the sides of the first substrate 110 and the second substrate 210, and between the first substrate 110 and the second substrate 210. The connection electrode 520 is also positioned in the space 490 between the first electrode layer 127a and the second electrode layer 127b. In addition, the connection electrode 520 is disposed between the second electrode layer 127b and the second substrate 210. The connection electrode 520 contacts the first electrode layer 127a, the second electrode layer 127b, and the metal sludge 510.

Although not illustrated, the connection electrode 520 may be connected with the driver. For example, the connection electrode 520 may be connected with a gate driver IC to receive a gate driving signal and transmit it to the gate pad portion 127. The connection electrode 520 may contact the first electrode layer 127a, the second electrode layer 127b, and the metal sludge 510 to increase a contact area, and thus contact resistance between the driver and the gate pad portion 127 may be reduced.

In an exemplary embodiment, the gate pad portion includes two electrode layers, a space is formed between the two electrode layers, and the metal sludge is positioned in the space. Accordingly, it is possible to reduce contact resistance between the gate pad portion and the connection electrode. However, the exemplary embodiments are not limited thereto. The data pad portion may also include two electrode layers, a space may be formed between the two electrode layers, and a metal sludge may be positioned in the space. Accordingly, it is possible to reduce contact resistance between the data pad portion and the connection electrode.

While this disclosure has been described in connection with what is considered to be practical exemplary embodiments, it is to be understood that the inventive concept is not limited to the disclosed exemplary embodiments, but, on the contrary, is intended to cover various modifications and equivalent arrangements included within the spirit and scope of the appended claims.

What is claimed is:

1. A display device, comprising:
a first substrate;
a first electrode layer disposed on an edge of the first substrate;
a second electrode layer disposed directly on the first electrode layer, the first electrode layer and the second electrode layer defining a space in between;
a metal sludge disposed in the space; and
a subsidiary electrode covering a side surface of the first substrate and connected with the first electrode layer, the second electrode layer, and the metal sludge.

2. The display device of claim 1, wherein the metal sludge further comprises a same material as at least one of the first electrode layer and the second electrode layer.

3. The display device of claim 2, wherein the first electrode layer and the second electrode layer comprise a same material.

4. The display device of claim 1, further comprising:
a second substrate facing the first substrate; and
a dam disposed between the first substrate and the second substrate.

5. The display device of claim 4, wherein the dam surrounds the subsidiary electrode in a plan view.

6. The display device of claim 4, further comprising a common electrode disposed below the second substrate,
wherein the dam is disposed between the common electrode and the subsidiary electrode.

7. The display device of claim 4, further comprising a spacer disposed between the dam and the second substrate.

8. The display device of claim 4, wherein the subsidiary electrode covers a side surface of the second substrate and is further disposed between the second electrode layer and the second substrate.

9. The display device of claim 1, wherein the first electrode layer and the second electrode layer constitute a gate pad portion.

10. The display device of claim 9, further comprising:
a gate electrode disposed on the first substrate;
a semiconductor configured to overlap the gate electrode; and
a source electrode and a drain electrode disposed on the semiconductor,
wherein the gate pad portion comprises a same material as the gate electrode.

11. The display device of claim 1, wherein the subsidiary electrode is made of a low-resistance metal.

12. The display device of claim 11, wherein the low-resistance metal is silver.

13. The display device of claim 1, wherein the metal sludge comprises copper or aluminum.

14. The display device of claim 1, wherein the second electrode layer and the first electrode layer contact each other.

15. The display device of claim 14, wherein the first electrode layer and the second electrode layer are not directly connected with each other at a place where the space is disposed.

16. The display device of claim 15, wherein the first electrode layer and the second electrode layer are connected to each other through the metal sludge at the place where the space is disposed.

17. The display device of claim 4, further comprising a light blocking member disposed below the second substrate.

18. The display device of claim 17, wherein:
   the first substrate and the second substrate are divided into a display area and a peripheral area surrounds edges of the display area; and
   the light blocking member is disposed in the entire peripheral area.

19. The display device of claim 9, further comprising a gate driver IC connected to the subsidiary electrode, and configured to send a gate driving signal to the subsidiary electrode.

20. The display device of claim 19, wherein the subsidiary electrode is configured to transmit the gate driving signal to the gate pad portion.

* * * * *